United States Patent
Wang et al.

(10) Patent No.: US 12,493,488 B2
(45) Date of Patent: Dec. 9, 2025

(54) WORKLOAD SCHEDULING USING QUEUES WITH DIFFERENT PRIORITIES

(71) Applicant: Google LLC, Mountain View, CA (US)

(72) Inventors: Yu Wang, San Jose, CA (US); Thomas Benjamin Jablin, Saratoga, CA (US); Caitlin King Stanton, San Francisco, CA (US)

(73) Assignee: Google LLC, Mountain View, CA (US)

( * ) Notice: Subject to any disclaimer, the term of this patent is extended or adjusted under 35 U.S.C. 154(b) by 514 days.

(21) Appl. No.: 17/963,897

(22) Filed: Oct. 11, 2022

(65) Prior Publication Data

US 2024/0118920 A1 Apr. 11, 2024
US 2025/0130850 A2 Apr. 24, 2025

(51) Int. Cl.
*G06F 9/48* (2006.01)

(52) U.S. Cl.
CPC .......... *G06F 9/4881* (2013.01); *G06F 9/4831* (2013.01)

(58) Field of Classification Search
CPC .... G06F 9/4881; G06F 9/4831; G06F 9/5038; G06F 9/4887; G06N 3/08; G06N 20/00
See application file for complete search history.

(56) References Cited

U.S. PATENT DOCUMENTS

| | | | | |
|---|---|---|---|---|
| 2003/0172104 A1* | 9/2003 | Hooman | ................ | G06F 9/4881 718/103 |
| 2003/0208521 A1* | 11/2003 | Brenner | ................ | G06F 9/4881 718/103 |
| 2004/0117791 A1* | 6/2004 | Prasad | ................ | G06F 9/4881 718/100 |
| 2004/0163084 A1* | 8/2004 | Devadas | ................ | H04L 47/39 718/103 |
| 2005/0281279 A1* | 12/2005 | Dennison | ................ | H04L 47/50 370/412 |
| 2009/0296728 A1* | 12/2009 | Srinivasan | .......... | H04L 12/4625 370/402 |
| 2010/0309783 A1* | 12/2010 | Howe | ................... | H04L 47/283 370/230 |
| 2010/0316470 A1* | 12/2010 | Lert | ..................... | B65G 1/0485 414/807 |
| 2014/0317380 A1* | 10/2014 | Yamamoto | ............ | G06F 9/4881 712/30 |

(Continued)

OTHER PUBLICATIONS freertos.org [online], "The Idle Task," Sep. 20, 2018, retrieved on Jan. 10, 2023, retrieved from URL<https://www.freertos.org/RTOS-idle-task.html>, 3 pages.

(Continued)

*Primary Examiner* — Tuan C Dao
(74) *Attorney, Agent, or Firm* — Fish & Richardson P.C.

(57) ABSTRACT

Methods, systems, and apparatus, including computer programs encoded on computer storage media, for scheduling workloads on computing resources using a high priority queue and a low priority queue. The high priority queue maintains pending high priority workloads to be scheduled for execution, and the low priority queue maintains pending low priority workloads to be scheduled for execution. The computing system as described in this specification schedules the pending low priority workloads for execution by utilizing computing resources provided by the system only when the high priority queue is empty.

20 Claims, 4 Drawing Sheets

(56) References Cited

U.S. PATENT DOCUMENTS

| | | | |
|---|---|---|---|
| 2015/0010139 A1* | 1/2015 | Tuchman | H04L 67/535 |
| | | | 379/265.09 |
| 2018/0189032 A1* | 7/2018 | Nurvitadhi | G06F 30/30 |
| 2020/0210256 A1* | 7/2020 | Chitnis | G06F 9/5027 |
| 2021/0304025 A1* | 9/2021 | Sridharan | G06F 9/4881 |
| 2022/0237438 A1* | 7/2022 | Mills | G06F 9/485 |

OTHER PUBLICATIONS microsoft.com [online], "CA1600: Do not use idle process priority," Apr. 29, 2022, retrieved on Jan. 10, 2023, retrieved from URL<https://docs.microsoft.com/en-us/visualstudio/code-quality/ca1600?view=vs-2022>, 1 page.

microsoft.com [online], "Scheduling Priorities," Jan. 7, 2021, retrieved on Jan. 10, 2023, retrieved from URL<https://learn.microsoft.com/en-us/windows/win32/procthread/scheduling-priorities>, 5 pages.

wikipedia.com [online], "Idle (CPU)," Feb. 26, 2008, retrieved on Jan. 10, 2023, retrieved from URL<https://en.wikipedia.org/wiki/Idle (CPU)>, 1 page.

* cited by examiner

WORKLOAD SCHEDULING USING QUEUES WITH DIFFERENT PRIORITIES

BACKGROUND

This specification relates to techniques for scheduling workloads on computing resources. Workloads may include batch jobs, computational tasks, application programs, or other processes, and each workload requires a specific set of resources for execution. Some workloads may include machine learning workloads, e.g., computations for training a neural network or computing an inference using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a computing system having one or more computers in one or more locations that schedules workloads submitted by clients of the system using a high priority queue and a low priority queue. The high priority queue maintains pending high priority workloads to be scheduled for execution, and the low priority queue maintains pending low priority workloads to be scheduled for execution. The computing system as described in this specification schedules the pending low priority workloads for execution by utilizing computing resources provided by the system only when the high priority queue is empty.

Particular embodiments of the subject matter described in this specification can be implemented so as to realize one or more of the following advantages. Unlike many existing cloud-based computing systems where workloads submitted by clients are served with the same priority, e.g., scheduled for execution by available computing resources on a first-in-first-serve basis, despite the fact that the workloads may not be equally time-sensitive, this specification describes workload scheduling techniques for prioritizing high priority workloads, such as latency-sensitive, online machine learning inference workloads, over low priority workloads, such as latency-tolerant, offline machine learning training workloads, to ensure that the high priority workloads can be finished within a desired latency budget. The described workload scheduling techniques can thus enhance performance of the computing system on such high priority workloads to better satisfy user needs. In some examples, using the described workload scheduling techniques can result in more than twice lower latency in execution of high priority tasks than conventional workload scheduling schemes. Additionally, because low priority workloads can then be scheduled for execution during the idle time during which at least some of the available computing resources of the computing system are not utilized, e.g., for the execution of high priority workloads, the described workload scheduling techniques can further improve overall hardware utilization of the computing system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
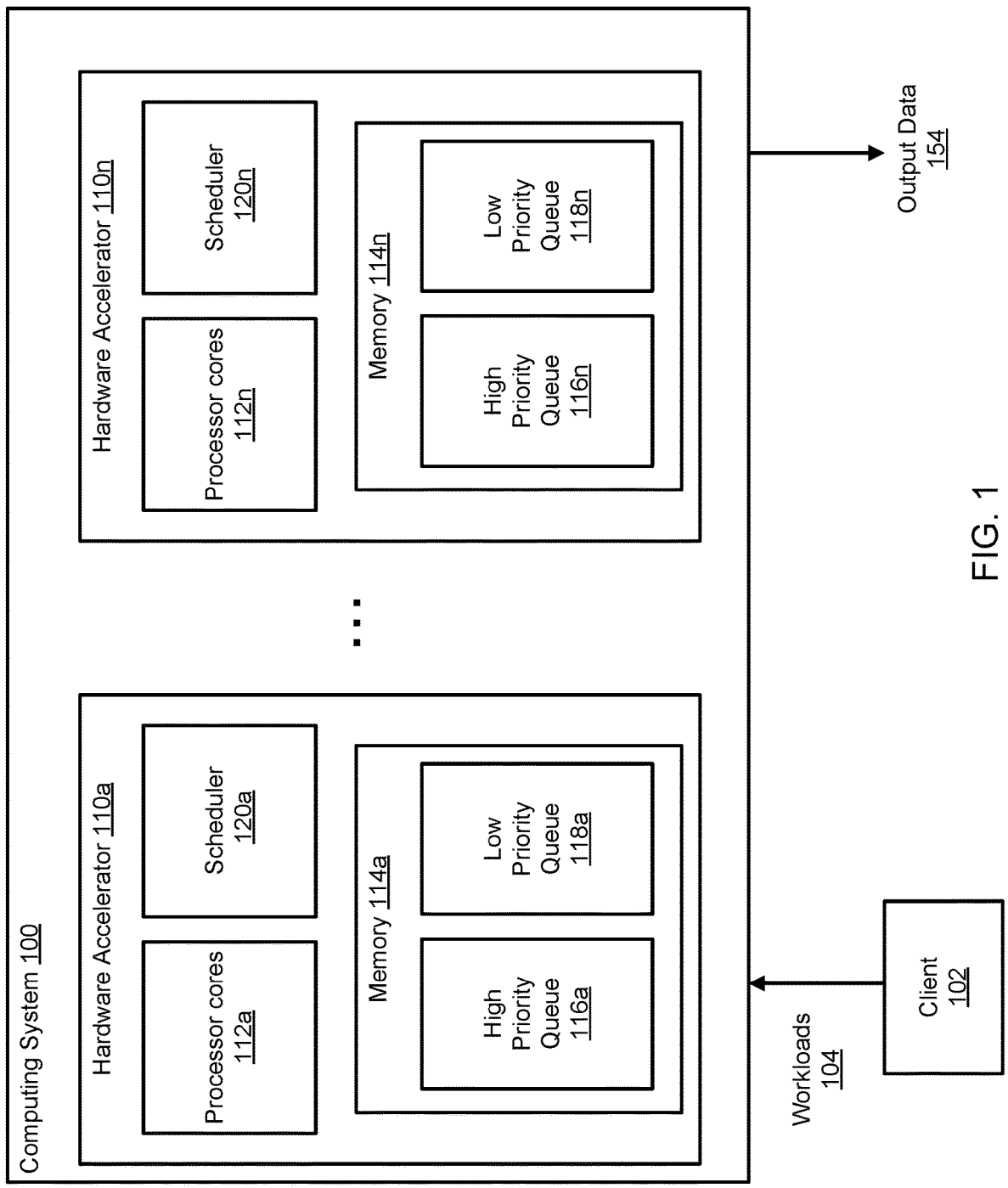
FIG. 1 illustrates an example computing system.

FIG. 1 illustrates an example computing system 100. The computing system 100 is typically hosted within a data center, which can be a distributed, cloud-based computing system having hundreds or thousands of hardware accelerators, e.g., hardware accelerator 110*a*-hardware accelerator 110*n*, in one or more locations. Hardware accelerators (or "accelerators" for short) are computing devices having specialized hardware configured to perform specialized computations. Examples of accelerators include graphics processing units ("GPUs"), field-programmable gate arrays ("FGPAs"), and application-specific integrated circuits ("ASICs"), including tensor processing units ("TPUs").

As a particular example, the accelerators can be accelerators for performing machine learning computations, e.g., neural network training or inference computations. One example of such an accelerator is a tensor processing unit (TPU), which is a special-purpose hardware chip that has at least two processor cores which each include a scalar processing unit, a vector processing unit, and one or more matrix multiply units, among other components, and an on-chip high bandwidth memory (HBM). That is, the hardware accelerator 110*a* in FIG. 1 can include multiple processor cores 112*a* that are each configured to have the aforementioned processing units, and a memory 114*a* that is configured as a high bandwidth memory (HBM). The memory 114*a* can store information accessible by the processor cores 112*a*, including instructions that can be executed by the processor cores 112*a*. The memory 114*a* can also include data that can be retrieved, manipulated, or stored by the processor cores 112*a*. Other hardware accelerators included in the computing system 100, e.g., hardware accelerator 110*n*, can have similar or different configurations.

The computing system 100 can additionally include a number of other computing devices including general purpose computers. Each computer can include one or more processors, memory, and other components typically present in general purpose computers. The processors can include a well-known multi-core processor, e.g., a multi-core central processing unit (CPU), or other lesser-known types of multi-core processors. The memory can be a type of non-transitory computer readable medium capable of storing information accessible by the processors, such as a hard-drive, solid state drive, tape drive, optical storage, memory card, ROM, RAM, DVD, CD-ROM, write-capable, and read-only memories.

These multi-core processors and memories provision computing resources, i.e., processing and memory capacities, for execution of workloads 104 submitted into the computing system 100. For example, the computing system can receive data that represents pending workloads 104 for execution from one or more client computers (or clients for brevity), e.g., client 102, over a data communication network, and generates output data 154 as a result of the execution of the workloads 104. Each workload can include a collection of tasks and various dependencies among those tasks. In general, a "workload" may refer to any particular type and/or amount of work to be performed by computing resources, while "tasks" may refer to discrete functions or sub-units of the workload that are each devoted to performing a particular computing task. In various cases, the workload and its tasks can be embodied as any collection of software, code, virtual machines, applications, containers, microservices, and so on.

In various cases, the workloads 104 specified by the client 102 may include machine learning workloads. A machine learning workload may include computations for training a neural network or computing an inference using a neural network. In some of these cases, the data representing the machine learning workload 104 may include source programs written in Python programming language by using appropriate Python programming frameworks such as TensorFlow and JAX, while in others of these cases, the data may alternatively include source programs written in another high-level programming language, such as C++ language.

As an example for illustration, the data representing a workload 104 provided by a client 102 may include or otherwise identify any kind of digital data input, and the computing system 100 can generate as output data 154 any kind of score, classification, regression, or generative output by virtue of using a machine learning model deployed at, or accessible by, the computing system 100 to process the input. As another example for illustration, the data representing a workload 104 provided by a client 102 may include or otherwise identify training data, and the computing system 100 can train a machine learning model, e.g., a neural network, on the training data to generate output data 154 specifying a trained instance of the model capable of computing a desired prediction for a particular machine learning task. For example, the computing system 100 can provide the output data 154 specifying the trained model, e.g., the trained values of the parameters of the neural network and data specifying the architecture of the neural network, to the client 102 which submitted the workload 104.

At any time of operation, the computing system 100 may receive multiple workloads 104 pending to be scheduled, e.g., from the same or different clients 102. These pending workloads may not all have the same priority level, which is generally an indication of urgency or time-sensitivity of a workload. Specifically, some workloads may be latency-sensitive and require immediate or near-immediate attention, whereas other workloads may be latency-tolerant and could be delayed for an amount of time. For example, the latency-sensitive workloads may include online machine learning inference workloads, and the latency-tolerant workloads may include offline machine learning training workloads, as well as other less time-sensitive machine learning inference workloads. Online machine learning is a method of machine learning in which data becomes available in a sequential order and is used to update a machine learning model as new data becomes available at each step, while offline machine learning uses batch learning techniques which generate a machine learning model by training the model on a training data set at once.

In some cases, the priority level associated with each workload can be defined or otherwise specified by the client 102 which submitted the workload. That is, every time a client 102 submits a workload, it additionally specifies a priority level for the workload, e.g., by way of adding to the data representing the workload 104 a high or low priority tag (or another explicit indicator), setting a desired completion deadline, which may be a time point for the workload 104 to be completed (where any workload that requires lower than a few microseconds or a few seconds of end-to-end latency since it is received may be determined as a latency-sensitive, and hence, high priority workload), and so on. In other cases, the system can automatically infer the priority level of the workload. For example, the data representing the workload 104 can be compared against a set of predetermined priority criteria, e.g., criteria that are defined with respect to the type, size, consumption cost of the workload, and the like, in order to determine the priority level for the workload 104. As another example, the data representing the workload 104 can be processed using a machine learning model trained to receive workload data and generate an output which classifies the workload as either a high priority or low priority workload as it is received.

As the computing system 100 receives the pending workloads 104 to be scheduled, the workloads are buffered in the memory resources provisioned by the system. Each received workload can be routed to and buffered at the memory of the same or different hardware accelerator(s) of the system, e.g., at one of memories 114*a-n* of hardware accelerators 110*a-n*. In some cases, this routing is fixed, where workloads submitted by a same client (or having a same type, or the like) will always be routed to the hardware accelerator(s) pre-allocated for the client (or the type, or the like), while in other cases, the system dynamically adjusts the routing based on load balancing of the system, individual capacity of the hardware accelerator, and the like.

To prioritize for execution of high priority workloads to ensure that the such latency-sensitive workloads can be finished within a desired latency budget, the computing system 100 maintains, at each memory, e.g., memory 114*a*, (1) a high priority queue, e.g., high priority queue 116*a*, configured to maintain pending high priority workloads to be scheduled for execution, and (2) a low priority queue, e.g., low priority queue 118*a*, configured to maintain pending low priority workloads to be scheduled for executions, as shown in FIG. 1.

While the description in this specification largely relates to having just two queues, it will be appreciated that in alternative implementations there can be more than two queues with different priority levels for each queue, e.g., a high priority queue, a medium priority queue, and a low priority queue, and the described workload scheduling techniques can be similarly applied to prioritize higher priority workloads over lower priority workloads. In addition, while the description in this specification largely relates to queues, it will be appreciated that the described workload scheduling techniques can be similarly applied to alternative implementations where a different data structure, e.g., a linked list with dynamic memory allocation, is used to buffer the pending workloads.

Further, although FIG. 1 illustrates the memory as being local to the processor cores, and that each memory maintains a respective high priority queue and a respective low priority queue therein, this is not required. In some implementations, the memory can be an external or off-chip memory relative to a hardware accelerator that includes one or more processor cores. For example, the memory can be disposed at a physical location that is outside of, and hence distant or non-local relative to, an integrated circuit die that represents a hardware accelerator of the computing system 100. In addition, in some implementations, the hardware accelerators may be grouped into pods. A pod refers to a group of two or more hardware accelerators connected to one another using a high-speed interconnect, with shared storage and/or network resources. Thus, in these implementations, within each pod there may be only a certain number of hardware accelerators, e.g., one hardware accelerator, that each have a memory maintaining a high priority queue and a low priority queue therein, while there are a larger number of hardware accelerators within the pod, e.g., 64 accelerators, 128 accelerators, or more, that need not maintain such high and low priority queues in their memories.

Figure 2:
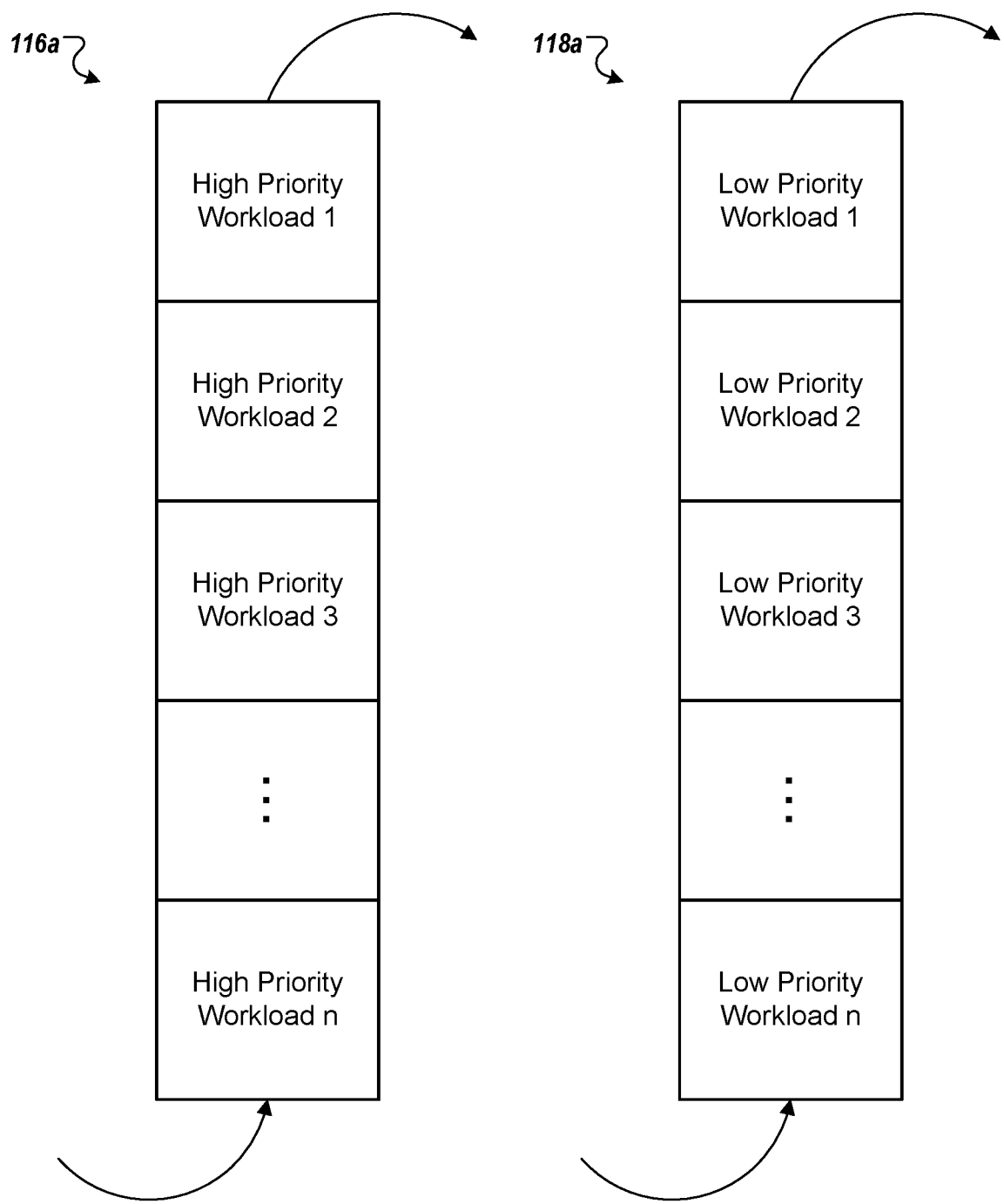
FIG. 2 is an example illustration of a high priority queue and a low priority queue.

FIG. 2 is an example illustration of a high priority queue and a low priority queue. For example, the high priority queue and the low priority queue can be the high and priority queues 116a and 118a that are maintained within memory 114a of hardware accelerator 110a of FIG. 1. In the example of FIG. 2, pending workloads High_Priority_Workload_1, High_Priority_Workload_2, High_Priority_Workload_3, through High_Priority_Workload_n, and Low_Priority_Workload_1, Low_Priority_Workload_2, Low_Priority_Workload_3, through Low_Priority_Workload_n, are shown. Each workload is identified according to a name, and further includes data indicating the priority level of the workload. Each queue implements a First-In-First-Out (FIFO) data structure configured to store data that represents the workloads.

Assuming these workloads are all routed to the hardware accelerator 110a as they are received, then the workloads having the high priority level (High_Priority_Workload_1, High_Priority_Workload_2, High_Priority_Workload_3, through High_Priority_Workload_n) are enqueued into the high priority queue 116a in the memory 114a, while the workloads having the low priority level (Low_Priority_Workload_1, Low_Priority_Workload_2, Low_Priority_Workload_3, through Low_Priority_Workload_n) will be enqueued into the low priority queue 118a in the memory 114a. Within each queue, the workloads may be enqueued into the queue in the order they are received. Later, when scheduling, the computing system 100 schedules the pending low priority workloads for execution across the processor cores 112a of the hardware accelerator 110a only when the high priority queue is empty, i.e., only when there exists no pending high priority workload that needs to be scheduled. This gives the high priority workloads a guaranteed precedence over the low priority workloads when being scheduled and, correspondingly, executed.

In more detail, the hardware accelerators 110a-n of the computing system 100 each implement a respective scheduler 120a-n therein to schedule the workloads buffered in the high and low priority queues for execution on the available computing resources provided by hardware accelerators. Each scheduler, e.g., scheduler 120a of hardware accelerator 110a, can execute scheduling logic implemented as software, code, and/or firmware deployed at least in part in the corresponding hardware accelerator. In some implementations, as will be described further below, the scheduling logic includes both workload assignment logic and resource allocation logic, while in other implementations, the scheduling logic includes just the workload assignment logic, and each assigned workload will always be executed by the same processor core(s) of the hardware accelerator. Put another way, in some implementations, each scheduler 120a-n executes logic for deciding which one or more particular workloads among all pending workloads should be executed but always assigns the decided workloads to the same accelerator core(s) for execution.

First, a scheduler of a given hardware accelerator, e.g., the scheduler 120a of the hardware accelerator 110a, decides which one or more particular workloads among all pending workloads should be assigned (or loaded) for execution by utilizing the available computing resources provided by the given hardware accelerator of the system. This decision, which will be made in accordance with the workload assignment logic of the scheduler, is based on the priority levels of the pending workloads; a decision to assign a particular workload for execution is always made for prioritizing high priority workloads over low priority workloads, and thereby lowering the latency in execution of the high priority workloads.

The workload assignment logic of the scheduler 120a begins with assigning pending workloads buffered in the high priority queue 116a for execution, and then assigns the pending low priority workloads buffered in the low priority queue 118a for execution only when the high priority queue 116a is empty. The high priority workloads queued in the high priority queue 116a are assigned for execution in the order that they are received, also referred to as First-Come, First-Served (FCFS) Scheduling.

Continuing with the example of FIG. 2, the earliest received High_Priority_Workload_1 is dequeued and then assigned for execution first, the second earliest received High_Priority_Workload_2 is dequeued and then assigned for execution next, and in that order, until the latest received High_Priority_Workload_n is dequeued and then assigned for execution, at which time the scheduler 120a begins to assign pending workloads buffered in the low priority queue 118a for execution. Note that in principle dequeuing a workload and assigning a workload for execution can happen in any order (i.e., dequeue a workload first and then assign the workload for execution, or the opposite), or simultaneously. Dequeuing a (to be executed or already executed) workload from the high priority queue 116a can be achieved through some predefined queue management logic, which may or may not be implemented as part of the scheduler 120a.

The low priority workloads queued in the low priority queue 118a are similarly assigned in the order that they are received, but only as long as the high priority queue 116a remains empty. For example, after assigning Low_Priority-_Workload_1 for execution, assuming a new workload High_Priority_Workload_n+1 is received by the system and buffered in the high priority queue 116a, then instead of assigning the next workload Low_Priority_Workload_1 in the low priority queue 118a, the scheduler 120a proceeds to assign the newly received High_Priority_Workload_3 for execution.

Next, when included, the resource allocation logic of the scheduler 120a decides how to actually assign the particular workloads for execution. That is, the scheduler 120a decides, by using the resource allocation logic that is optionally included therein, how to allocate an appropriate group of computing resources of the hardware accelerator 110a to execute the particular workloads. In some implementations where no resource allocation logic is included, the hardware accelerator 110a can always use the same processor core(s) to execute the particular workloads. In those other implementations where the resource allocation logic is included, the scheduler 120a can determine or otherwise identify available computing resources of the hardware accelerator 110a, e.g., by communicating with a resource manager of the system to assess information associated with computing resources available for workload execution, and decide an amount of available computing resources of the hardware accelerator 110a, e.g., how many and which processor cores of the hardware accelerator that are in an available state (e.g., in an idle or partially idle state), to allocate for execution of the one or more particular workloads. For example, the scheduler 120a can allocate each of the multiple processor cores of the hardware accelerator to execute a respective particular workload, or a respective portion of the same particular workload.

This decision may or may not be based on priority levels of the pending workloads; a decision on how to assign a workload may additionally or alternatively be made based on other information of the pending workloads. For example, in the case of machine learning workloads, respective portions of a workload, e.g., the functions or sub-units of the workload, can be distributed across one or more hardware accelerators for execution in accordance with a dataflow graph that represents the workload. As another example, the consumption cost of a workload may be taken into account while deciding how to assign the workload for execution. The consumption cost may indicate an anticipated consumption level of the workload, namely how many computing resources are anticipated to be consumed in performing the workload. The consumption cost may for example be a number of processor cores, an amount of high bandwidth memory, or the like.

In some implementations, the scheduling process can be non-preemptive while in other implementations, the scheduling process can be preemptive. Non-preemptive scheduling are designed so that once execution of a workload enters the running state, it cannot be preempted until the execution is completed, whereas the preemptive scheduling is based on priority where the scheduler may preempt the execution of a low priority workload anytime when a high priority workload is received by the system.

Figure 3:
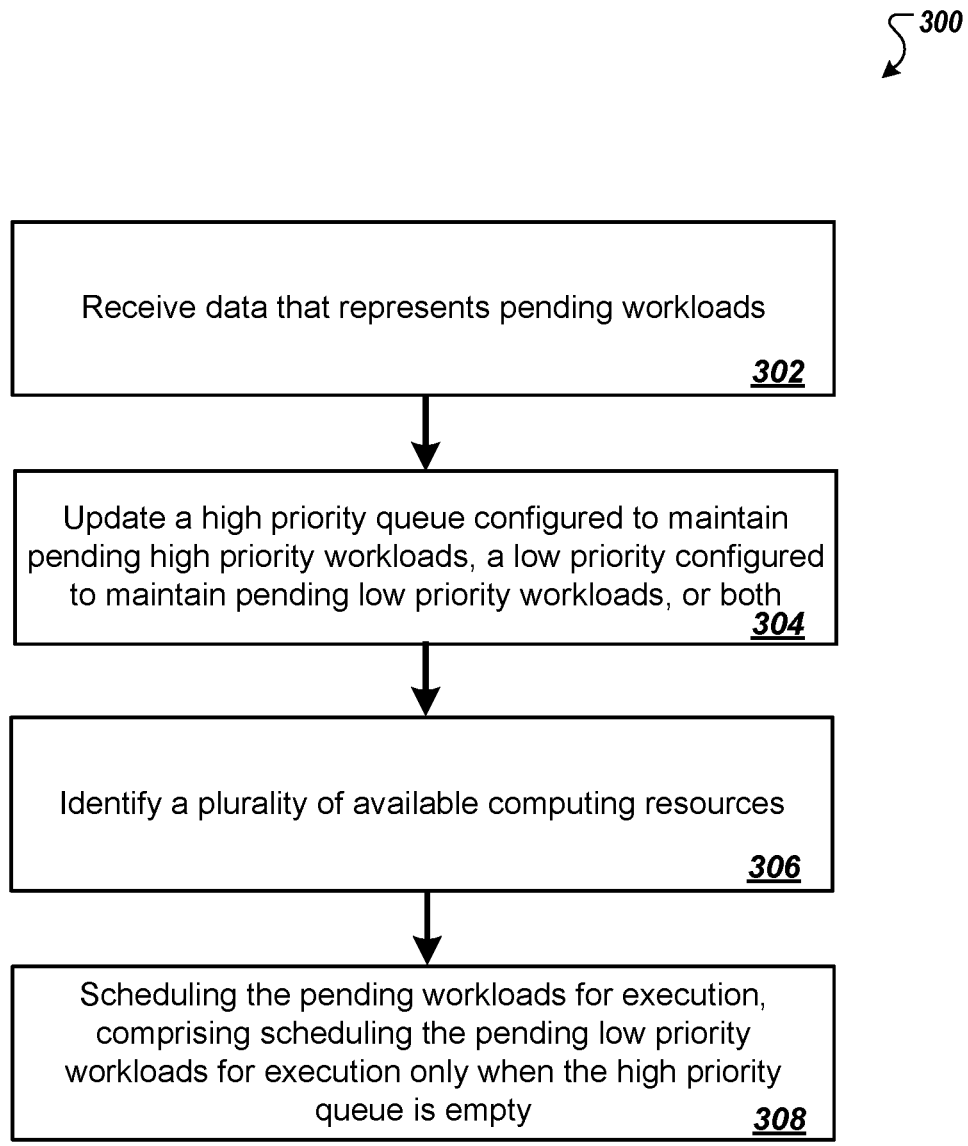
FIG. 3 is a flow diagram of an example process for scheduling workloads.

FIG. 3 is a flow diagram of an example process 300 for scheduling workloads. For convenience, the process 300 will be described as being performed by a system of one or more computers located in one or more locations. For example, a distributed computing system, e.g., the system 100 of FIG. 1, appropriately programmed in accordance with this specification, can perform the process 300.

In general, the system can perform the process 300 at each of one or more hardware accelerators of the system. Each hardware accelerator has one or more processor cores and a memory that provision computing resources, i.e., processing and memory capacities, for execution of workloads submitted by clients. Each hardware accelerator implements a scheduler that is local to (i.e., implemented at least in part on) the hardware accelerator.

The system receives, at the hardware accelerator, data that represents pending workloads for execution from one or more clients in data communication with the system (step 302).

In some cases, the workloads include machine learning workloads, e.g., computations for training a neural network or computing an inference using a neural network. In some cases, the data that represents the workloads may define or otherwise specify a respective priority level for each workload. For example, the data may include a corresponding priority tag indicating whether the workload has a high priority or a low priority. As another example, the data may include a desired completion deadline, which may be a time point for the workload to be completed.

The system updates, within the memory of the hardware accelerator, a high priority queue, a low priority queue, or both to include the pending workloads for execution (step 304). The high priority queue can implement a FIFO data structure within the memory that is configured to maintain pending high priority workloads to be scheduled for execution. Likewise, the low priority queue can implement a FIFO data structure within the memory that is configured to maintain pending low priority workloads to be scheduled for execution. Generally, high priority workloads include workloads having target latencies that are below a predetermined latency threshold, and low priority workloads include workloads having target latencies that are above the predetermined latency threshold.

When the pending workloads include one or more pending high priority workloads, the system enqueues the one or more pending high priority workloads into the high priority queue. Additionally or alternatively, when the pending workloads include one or more pending low priority workloads, the system enqueues the one or more pending low priority workloads into the low priority queue. Within each queue, the workloads can be enqueued into the queue in the order they are received. A workload can be enqueued in each queue by adding an identifier, function pointer, or some other reference to the workload to an entry of the queue. For example, an identifier or metadata with which the system can locate the compiled machine code for the workload can be added to an entry of the queue. As another example, a pointer to the location of the compiled machine code can be added to an entry of the queue.

In other words, the system determines, i.e., receives or generates, a priority level for each incoming workload as it is being received, and then buffers it at either the high priority queue or the low priority queue which may, or may not, have any workloads pending therein. If a received workload is a high priority workload, the high priority workload is enqueued into the high priority queue. Alternatively, if a received workload is a low priority workload, the low priority workload is enqueued into the low priority queue.

The system determines or otherwise identifies a plurality of available computing resources provided by the one or more processor cores of the hardware accelerator (step 306). For example, computing resources for workload execution can be provisioned by processor cores that are in an available state (e.g., in an idle, or partially idle state).

The system schedules the pending workloads for execution on the plurality of available computing resources (step 308). This includes obtaining queue information, such as the end pointer locations of the queues, to make a determination about whether the high priority queue or the low priority queue or both are empty. In particular, the system begins with scheduling pending workloads queued in the high priority queue 116a for execution, and schedules the pending low priority workloads for execution only when the high priority queue is empty. In some implementations, the high priority workloads queued in the high priority queue are assigned for execution in the order that they are received.

When it comes the turn to be scheduled, a workload may either be scheduled for immediate execution on the plurality of available computing resources without delay, or scheduled for execution at a future time. To execute a workload, the one or more processor cores can fetch data required for workload execution from the memory coupled to processor cores, or the memory of another computing device or both, according to the received data that represents the workload, and execute the workload by processing the fetched data using the one or more processor cores.

Within the high priority queue, a pending high priority workload will be dequeued from the high priority queue and then assigned by the system for execution by the plurality of available computing resources. The system will generally proceed to dequeue a next pending workload from high priority queue, and correspondingly assign the next pending workload queued in the high priority queue for execution, until the high priority queue is empty and the last pending workload queued in the high priority queue is assigned for execution, at which time the system will then proceed to assign the pending low priority workload queued in the low priority queue for execution.

Figure 4:
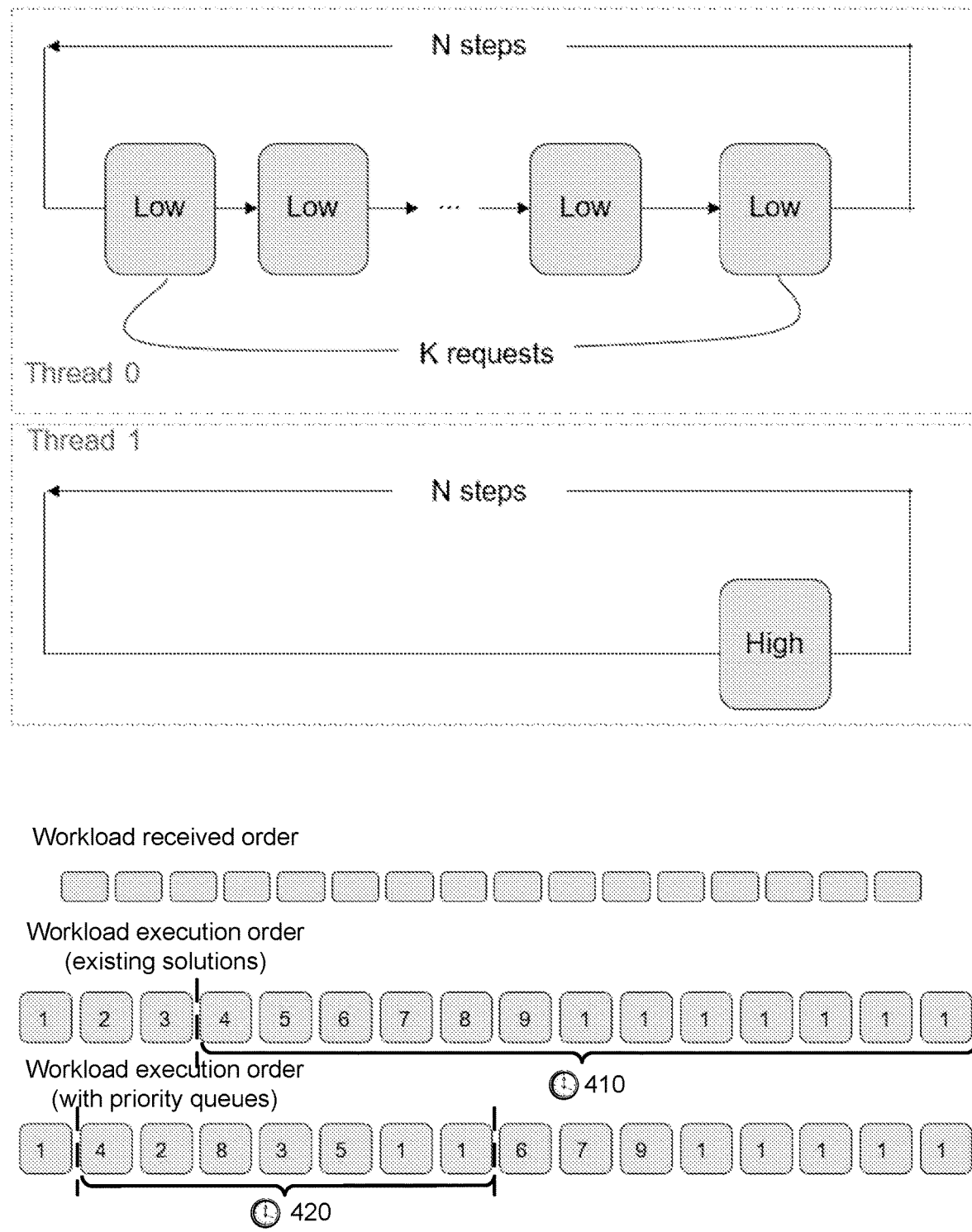
FIG. 4 is an example illustration of performance gain by scheduling workloads by using a high priority queue and a low priority queue.

FIG. 4 is an example illustration of performance gain by scheduling workloads by using a high priority queue and a low priority queue. As illustrated, low and high priority workload are received, e.g., asynchronously and from different threads, where low priority workloads are received N times more frequently than high priority workloads. N is the total number of iterations, which is also the total number of high priority workloads. K is the ratio of low priority high priority workloads over high priority high priority workloads, and K×N is the total number of low priority high priority workloads.

In the example of FIG. 4, performance is measured as the latency beginning from a time point where the first workload is received, to a time point where the execution of the last high priority workload is completed. It will be appreciated that the latency is reduced by scheduling workloads using a high priority queue and a low priority queue, compared with existing scheduling solutions (latency 410 versus latency 420).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. A method performed by a system comprising a pod of a plurality of hardware accelerators, wherein each hardware accelerator comprises one or more processor cores and a memory, wherein the method comprises:

receiving data that represents pending machine learning workloads for execution from one or more clients in data communication with the pod;

maintaining, within the memory of each of a subset of the plurality of hardware accelerators in the pod, a respective high priority queue and a respective low priority queue without maintaining both a respective high priority queue and a respective low priority queue within the memory of each of a remaining subset of the plurality of hardware accelerators in the pod;

updating, within the memory of each of the subset of the plurality of hardware accelerators in the pod, the high priority queue configured to maintain pending high priority machine learning workloads to be scheduled for execution, the low priority configured to maintain pending low priority machine learning workloads to be scheduled for execution, or both to include the pending machine learning workloads for execution, comprising:
  when the pending machine learning workloads comprise one or more pending high priority machine learning workloads, enqueuing the one or more pending high priority machine learning workloads into the high priority queue; and
  when the pending machine learning workloads comprise one or more pending low priority machine learning workloads, enqueuing the one or more pending low priority machine learning workloads into the low priority queue;
identifying a plurality of available computing resources provided by the one or more processor cores included in each hardware accelerator in the pod;
generating a schedule for scheduling the pending machine learning workloads for execution on the plurality of available computing resources provided by the one or more processor cores included in each hardware accelerator in the pod, comprising scheduling the pending low priority machine learning workloads for execution only when the high priority queue is empty; and
executing, in accordance with the schedule, the pending machine learning workloads by the one or more processor cores included in each hardware accelerator in the pod.

2. The method of claim 1, wherein the plurality of hardware accelerators each comprises: 1) multiple processor cores each comprising a matrix processing unit, a vector processing unit, or both, and 2) a high bandwidth memory.

3. The method of claim 1, wherein the pending high priority machine learning workloads comprise machine learning workloads having target latencies that are below a predetermined latency threshold, and the pending low priority machine learning workloads comprises machine learning workloads having target latencies that are above the predetermined latency threshold.

4. The method of claim 1, wherein receiving data that represents pending machine learning workloads for execution from one or more clients in data communication with the system comprise:
  receiving data that identifies, for each pending machine learning workload, a corresponding priority tag indicating whether the pending machine learning workload has a high priority or a low priority.

5. The method of claim 1, wherein scheduling the pending machine learning workloads for execution comprises:
  dequeuing a pending machine learning workload from the high priority queue and then executing the pending machine learning workload.

6. The method of claim 1, wherein scheduling the pending machine learning workloads for execution on the plurality of available computing resources comprises:
  scheduling the pending high priority machine learning workloads for immediate execution across the plurality of available computing resources.

7. The method of claim 1, wherein scheduling the pending machine learning workloads for execution on the plurality of available computing resources comprises:
  scheduling the pending machine learning workloads for execution by using a non-preemptive scheduling algorithm in which execution of an already running low priority machine learning workload is not preempted until completion.

8. The method of claim 1, wherein the subset of the plurality of hardware accelerators in the pod comprises only one hardware accelerator.

9. A system comprising one or more computers comprising one or more processor cores and one or more storage devices comprising a memory storing instructions that when executed by the one or more computers cause the one or more computers to perform operations comprising:
  receiving, by a pod of a plurality of hardware accelerators, data that represents pending machine learning workloads for execution from one or more clients in data communication with the pod, wherein each hardware accelerator comprises one or more processor cores and a memory;
  maintaining, within the memory of each of a subset of the plurality of hardware accelerators in the pod, a respective high priority queue and a respective low priority queue without maintaining both a respective high priority queue and a respective low priority queue within the memory of each of a remaining subset of the plurality of hardware accelerators in the pod;
  updating, within the memory of each of the subset of the plurality of hardware accelerators in the pod, the high priority queue configured to maintain pending high priority machine learning workloads to be scheduled for execution, the low priority configured to maintain pending low priority machine learning workloads to be scheduled for execution, or both to include the pending machine learning workloads for execution, comprising:
    when the pending machine learning workloads comprise one or more pending high priority machine learning workloads, enqueuing the one or more pending high priority machine learning workloads into the high priority queue; and
    when the pending machine learning workloads comprise one or more pending low priority machine learning workloads, enqueuing the one or more pending low priority machine learning workloads into the low priority queue;
  identifying a plurality of available computing resources provided by the one or more processor cores included in each hardware accelerator in the pod;
  generating a schedule for scheduling the pending machine learning workloads for execution on the plurality of available computing resources provided by the one or more processor cores included in each hardware accelerator in the pod, comprising scheduling the pending low priority machine learning workloads for execution only when the high priority queue is empty; and
  executing, in accordance with the schedule, the pending machine learning workloads by the one or more processor cores included in each hardware accelerator in the pod.

10. The system of claim 9, wherein the plurality of hardware accelerators each comprises: 1) multiple processor cores each comprising a matrix processing unit, a vector processing unit, or both, and 2) a high bandwidth memory.

11. The system of claim 9, wherein the pending high priority machine learning workloads comprise machine learning workloads having target latencies that are below a predetermined latency threshold, and the pending low priority machine learning workloads comprises machine learning workloads having target latencies that are above the predetermined latency threshold.

12. The system of claim 9, wherein receiving data that represents pending machine learning workloads for execution from one or more clients in data communication with the system comprise:
  receiving data that identifies, for each pending machine learning workload, a corresponding priority tag indicating whether the pending machine learning workload has a high priority or a low priority.

13. The system of claim 9, wherein scheduling the pending machine learning workloads for execution comprises:
dequeuing a pending machine learning workload from the high priority queue and then executing the pending machine learning workload.

14. The system of claim 9, wherein scheduling the pending machine learning workloads for execution on the plurality of available computing resources comprises:
scheduling the pending high priority machine learning workloads for immediate execution across the plurality of available computing resources.

15. The system of claim 9, wherein scheduling the pending machine learning workloads for execution on the plurality of available computing resources comprises:
scheduling the pending machine learning workloads for execution by using a non-preemptive scheduling algorithm in which execution of an already running low priority machine learning workload is not preempted until completion.

16. The system of claim 9, wherein the subset of the plurality of hardware accelerators in the pod comprises only one hardware accelerator.

17. One or more non-transitory computer-readable storage media comprising a memory storing instructions that when executed by one or more computers comprising one or more processor cores cause the one or more computers to perform operations comprising:
receiving, by a pod of a plurality of hardware accelerators, data that represents pending machine learning workloads for execution from one or more clients in data communication with the pod, wherein each hardware accelerator comprises one or more processor cores and a memory;
maintaining, within the memory of each of a subset of the plurality of hardware accelerators in the pod, a respective high priority queue and a respective low priority queue without maintaining both a respective high priority queue and a respective low priority queue within the memory of each of a remaining subset of the plurality of hardware accelerators in the pod;
updating, within the memory of each of the subset of the plurality of hardware accelerators in the pod, the high priority queue configured to maintain pending high priority machine learning workloads to be scheduled for execution, the low priority configured to maintain pending low priority machine learning workloads to be scheduled for execution, or both to include the pending machine learning workloads for execution, comprising:
when the pending machine learning workloads comprise one or more pending high priority machine learning workloads, enqueuing the one or more pending high priority machine learning workloads into the high priority queue; and
when the pending machine learning workloads comprise one or more pending low priority machine learning workloads, enqueuing the one or more pending low priority machine learning workloads into the low priority queue;
identifying a plurality of available computing resources provided by the one or more processor cores included in each hardware accelerator in the pod;
generating a schedule for scheduling the pending machine learning workloads for execution on the plurality of available computing resources provided by the one or more processor cores included in each hardware accelerator in the pod, comprising scheduling the pending low priority machine learning workloads for execution only when the high priority queue is empty; and
executing, in accordance with the schedule, the pending machine learning workloads by the one or more processor cores included in each hardware accelerator in the pod.

18. The storage media of claim 17, wherein the plurality of hardware accelerators each comprises: 1) multiple processor cores each comprising a matrix processing unit, a vector processing unit, or both, and 2) a high bandwidth memory.

19. The storage media of claim 17, wherein the pending high priority machine learning workloads comprise machine learning workloads having target latencies that are below a predetermined latency threshold, and the pending low priority machine learning workloads comprises machine learning workloads having target latencies that are above the predetermined latency threshold.

20. The storage media of claim 17, wherein receiving data that represents pending machine learning workloads for execution from one or more clients in data communication with the system comprise:
receiving data that identifies, for each pending machine learning workload, a corresponding priority tag indicating whether the pending machine learning workload has a high priority or a low priority.

* * * * *